ent Office 3,454,648
Patented July 8, 1969

3,454,648
5-6-DIPHENYLPHYDRO- to 5,6-DIPHENYLHYDRO
Daniel Lednicer, Portage, Mich., assignor to The Upjohn
Company, Kalamazoo, Mich., a corporation of
Delaware
No Drawing. Continuation-in-part of application Ser. No.
545,555, Apr. 27, 1966. This application May 24, 1968,
Ser. No. 731,706
Int. Cl. C07c 49/76, 45/00
U.S. Cl. 260—590                                    5 Claims

ABSTRACT OF THE DISCLOSURE

Novel 5,6 - diphenyl - 4,6,7,8-tetrahydro-2(3H)-naphthalenones, 5,6 - diphenyl - 4a-lower-alkyl-4,4a,7,8-tetrahydro - 2(3H) - naphthalenones and processes for the preparation thereof. The compounds of this invention are all active as estrogenic and cholesterol lowering agents and are of particular value as antifertility agents.

Cross reference to related applications

This application is a continuation-in-part of application Ser. No. 545,555, filed Apr. 27, 1966, now abandoned.

Summary of the invention

This invention relates to certain 5,6-diarylhydro-2(3H)-naphthalenones and more particularly to the 5,6-diphenylhydro - 2(3H) - naphthalenones represented by structural Formulas I and Ia, below, and to processes for the preparation thereof:

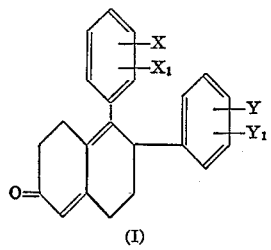

and

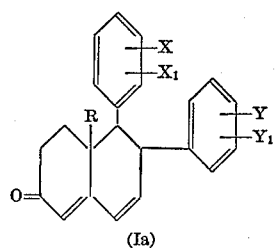

wherein X, X$_1$, Y and Y$_1$ are each hydrogen, lower-alkyl or halogen and R is lower-alkyl.
The term "lower-alkyl" means an alkyl radical of from 1 to 8 carbon atoms, inclusive, such as methyl, ethyl, propyl, butyl, pentyl, hexyl, heptyl, octyl, and isomeric forms thereof. The term "halogen" means fluorine, chlorine, and bromine.

The novel compounds of this invention as defined by each of Formulas I and Ia, above are each active as antifertility, estrogenic, and as cholesterol lowering agents. Illustratively, the compounds 5,6-diphenyl-4,6,7,8-tetrahydro-2(3H)-naphthalenone and 5,6-diphenyl-4a-methyl - 4,4a,7,8 - tetrahydro-2(3H)-naphthalenone exhibit oral antifertility activity in rats when tested by the method described by Duncan et al., Proc. Soc. Exp. Biol. Med., 112, 439–442, 1963 and they each exhibit oral estrogenic activity when tested in rats using the method of Allen and Doisy, J. Am. Med. Assoc., 81, 819, 1923.

For purposes of administration to birds and to mammals including animals of economic value such as horses, cattle, sheep, pigs, mice, rats, rabbits, and the like, the novel compounds of the invention can be combined with solid or liquid pharmaceutical carriers and formulated in the form of tablets, powder packets, capsules, and the like solid dosage forms, using starch and like excipients, or dissolved or suspended in suitable solvents or vehicles, for oral or parenteral administration.

The novel compounds of Formulas I and Ia of this invention by virtue of their antifertility activity, prevent procreation and are thus valuable for animal pest control. For example, the compounds of the invention are formulated in combination with baits and/or attractants and placed in feeding stations accessible to undesirable rodents and other small animals including Canidae such as coyotes, foxes, wolves, jackals, and wild dogs, and birds such as starlings, gulls, redwing blackbirds, pigeons, and the like, to greatly reduce the population thereof. The compounds of this invention can thus be used to reduce hazards to aviation by lessening the presence of birds and animals on runways and in the vicinity of airfields. The compounds of this invention can also be used to reduce the population of these undesirable birds and animals so as to aid in the prevention and the spread of disease, and to reduce the destruction of property in both rural and urban areas.

Detailed description of the invention

The novel compounds of this invention can be prepared according to the following reaction scheme:

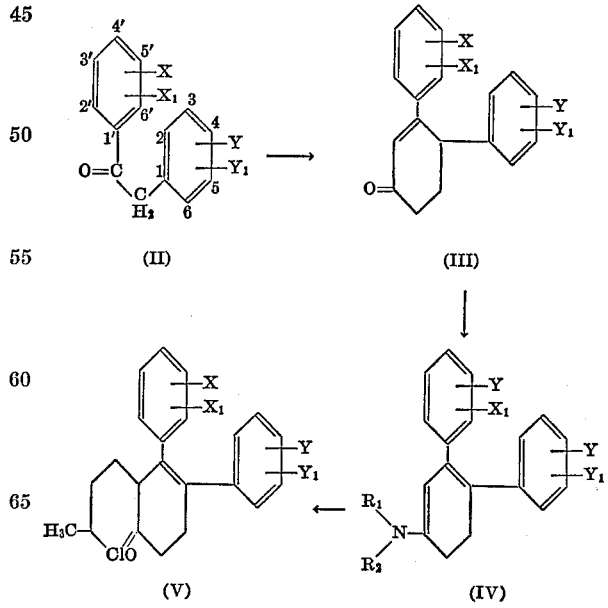

wherein X, X₁, Y, Y₁ and R have the significance hereinbefore defined and R₁ and R₂ taken separately, are each lower-alkyl as hereinbefore defined and R₁ and R₂ taken together with —N< constitute a saturated heterocyclic amino radical

of from 5 to 9 ring atoms, inclusive, wherein Z is alkylene, oxadialkylene, thiadialkylene, and N-lower-alkylazadialkylene. The term "saturated heterocyclic amino radical

of from 5 to 9 ring atoms, inclusive," includes, for example, pyrrolidino, alkylpyrrolidino such as 2-methylpyrrolidino, 2,2-dimethylpyrrolidino, and the like, piperidino, alkylpiperidino such as 2-methylpiperidino, 3-methylpiperidino, 4,4-dimethylpiperidino and the like, alkylpiperazino such as 4-methylpiperazino and the like, morpholino, alkylmorpholino such as 2-methylmorpholino, 3-methylmorpholino and the like, hexamethylenimino, homomorpholino, thiamorpholino, octamethylenimino, and the like.

The starting materials, the deoxybenzoins of Formula II, are generally known in the art. They can be prepared by conventional methods, for example, by reaction of the appropriate phenylacetyl halide with the appropriate benzene under the standard conditions of the Friedel-Crafts reaction.

In the process of this invention for the preparation of the compounds of Formula I, the deoxybenzoin (II) is condensed with methyl vinyl ketone to produce the corresponding 3,4-diphenyl-2-cyclohexen-1-one (III) under conditions conventionally employed in the homoannulation sequence. See, for example, chapter 3, The Michael Reaction, Bergmann et al., Organic Reactions, vol. 10, Wiley and Sons, New York, N.Y. (1959). Thus, for example, the selected deoxybenzoin (II) is reacted with an alkanol-free alkali-metal alkoxide (e.g., sodium and potassium methoxides, ethoxides and the like) to obtain the corresponding alkali-metal enolate which is then subjected to a condensation reaction with methyl vinyl ketone to obtain the corresponding 3,4-diphenyl-2-cyclohexen-1-one (III). The reaction is carried out in an inert organic solvent such as benzene, toluene, ether, dimethylformamide, tetrahydrofuran, and the like. The methyl vinyl ketone is conveniently added to a mixture of the alkali-metal enolate and inert solvent with external cooling of the reaction vessel, followed by heating for a sufficient period, preferably at reflux, to complete the condensation reaction. The 3,4-diphenyl-2-cyclohexen-1-one (III) is isolated from the reaction mixture and purified by conventional procedures, for example, by solvent extraction followed by chromatography and/or recrystallization from a suitable solvent, such as petroleum ether, hexane, benzene, toluene, ether, dimethylformamide and the like.

The cyclohexene (III) so obtained is then converted to the corresponding 3,4 - diphenyl - 1 - amino-1,3-cyclohexadiene, i.e., the enamine (IV), by reaction with the appropriate secondary amine of the formula $$\begin{array}{c} R_1 \\ \diagdown \\ NH \\ \diagup \\ R_2 \end{array}$$

wherein R₁ and R₂ have the significance hereinbefore defined. The enamine formation can be carried out in accordance with the general method described by Stork et al., J. Amer. Chem. Soc., 85, 207–222 (1963), or the procedure of Blanchard, J. Org. Chem., 28, 1397–1398 (1963). The enamine formation is generally carried out with 1.5 to 2 equivalents of a secondary amine in the presence of benzene or toluene. In some instances, p-toluenesulfonic acid is used as a catalyst. The reaction mixture is ordinarily heated at the reflux temperature using a water separator for from about 5 to about 24 hours or until water separation ceases. The enamine product is recovered from the reaction mixture by conventional methods, for example, evaporation to dryness under reduced pressure and recrystallization of the residue from a suitable solvent such as those hereinbefore listed. Enamines tend to be unstable, particularly in the presence of water. It is good practice to store them in the cold under nitrogen unless they are to be used soon after they are prepared.

Dialkylamines which can be used in the process of the present invention include for example, dimethylamine, diethylamine, diisopropylamine, diisobutylamine, dihexylamine, dioctylamine, and the like. Saturated heterocyclic amines which can be used include, for example, those secondary amines which correspond to the heterocyclic amino radicals hereinbefore listed. Of these pyrrolidine is generally preferred.

The enamine (IV) so obtained is converted to the desired 5,6-diphenyl-4,6,7,8-tetrahydro-2(3H)-naphthalenone (I) of this invention in accordance with the general method which has been used for the formation of the A-ring in the total synthesis of 19-nor steroids. See, for example, Velluz et al., Angew. Chem. 72, 725 (1960). Thus, the selected enamine (IV) is reacted with 1,3-dichloro-2-butene in the presence of sodium or potassium iodide, to obtain the corresponding 2 - (3 - chloro-2-butenyl) - 3,4 - diphenyl - 3-cyclohexen-1-one (V), which gives on treatment with concentrated sulfuric acid a mixture comprising the corresponding 2-(3-oxobutyl)-3,4-diphenyl-2-cyclohexen-1-one (VI) and the desired 5,6-diphenyl - 4,6,7,8 - tetrahydro - 2(3H)-naphthalenone (I), which can be separated from the reaction mixture by conventional methods such as chromatography and/or recrystallization from a suitable organic solvent, e.g., an alkanol. The compound (VI) is converted to the corresponding compound of Formula I by dehydration. The dehydration can be effected by heating the compound (VI) in a solvent such as benzene, toluene, xylene, and the like which forms an azeotrope with water, in the presence of a trace of a strong acid such as benzenesulfonic acid, p-toluenesulfonic acid and the like. The water which is formed in the dehydration is removed from the reaction mixture azeotropically. There is thereby obtained a solution of the desired compound (I) which can be isolated from the reaction mixture by evaporation or other conventional procedures. It is often advantageous to carry out the dehydration without first isolating the product (I) from the reaction mixture obtained after treatment of (V) with sulfuric acid.

In the conversion of the enamine (IV) to the desired compound (I), the above-described reaction procedure can be carried out without isolation of the intermediates (V) and (VI). When this procedure is used the desired product (I) is recovered from the reaction mixture by conventional methods such as chromatography and/or crystallization from a suitable organic solvent, for example, cyclohexane, ligroin, aqueous methanol, petroleum hydrocarbons, e.g., Skellysolve B hexanes, and the like.

Alternatively, the selected enamine (IV) can be converted to the corresponding compound of Formula I by a modified homoannulation sequence. The enamine is first subjected to a Michael type reaction which comprises condensation of the enamine (IV) with methyl vinyl ketone, followed by acid hydrolysis and cyclization to obtain the corresponding 5,6-diphenyl-4,6,7,8-tetrahydro-2(3H)-naphthalenone of Formula I. The above reaction sequence is conveniently carried out without isolation of intermediates. The Michael type condensation is advantageously carried out in the presence of a suitable organic solvent such as benzene, toluene, tetrahydrofuran and the like, in the manner disclosed by Bergmann et al., supra. The acid hydrolysis and cyclization reactions are carried out with acetic acid in the presence of sodium acetate. In the above reaction sequence temperatures favorable for completion of the reactions without decomposition of the desired intermediates are advantageously employed. Temperatures within the range of from 0° C. to the boiling point of the solvent employed have been found advantageous.

In the process of this invention the 5,6-diphenyl-4a-lower-alkyl-4,4a,7,8-tetrahydro-2(3H)-naphthalenones of Formula Ia are prepared in two steps, starting with the enamines (IV). The enamine is first alkylated in a dry inert organic solvent such as dimethylformamide, ethanol, methanol, isopropanol, butanol, ethyl acetate, chlorinated hydrocarbons, and the like with an excess of alkylating agent such as a lower-alkyl halide. Lower-alkyl halides thus employed are those wherein the lower-alkyl group has from 1 to 8 carbon atoms, inclusive, as hereinbefore defined and the halogen is chlorine, bromine, or iodine, with bromine and iodine generally preferred. Representative alkyl halides include methyl, ethyl, propyl, isopropyl, butyl and isobutyl bromides and iodides and the like. The corresponding alkyl chlorides are also operative, but are less satisfactory. The preferred method is to treat the enamine (IV) with an excess of alkyl iodide in dimethylformamide under nitrogen at about room temperature until the reaction is complete.

The alkylated enamine thus produced is then hydrolyzed with water, or aqueous acid or base. The preferred method for the hydrolysis is to add water directly to the enamine-alkyl halide reaction mixture after the alkylation is complete and to allow the aqueous mixture to hydrolyze at about 25° C. until hydrolysis is complete. The 3,4-diphenyl-2-lower-alkyl-3-cyclohexen-1-one (VII) thus obtained is isolated from the reaction mixture by conventional methods. For example, the compound (VII) is extracted from the reaction mixture with a water immiscible solvent such as ether, methylene chloride, benzene, toluene, hexane, and the like, then dried over a drying agent and the solvent removed by distillation, followed by recrystallization or chromatography to obtain compound (VII).

The 5,6-diphenyl-4a-lower-alkyl-4,4a,7,8-tetrahydro-2(3H)-naphthalenones of Formula Ia are prepared by condensing the compounds of Formula VII with methyl vinyl ketone in the presence of an inert solvent such as benzene, toluene, and the like, and an alkali-metal alkoxide sodium and potassium methoxides, ethoxides and the like. A preferred procedure is to add a solution consisting of inert solvent, methyl vinyl ketone and a compound of Formula VII to a suspension of alkanol-free alkali-metal alkoxide in the inert solvent, maintaining the mixture between about 10° and about 100° C. for between about 1 and about 4 hours. The resulting compound of Formula Ia is isolated from the reaction mixture and purified by conventional procedures, for example, by solvent extraction followed by chromatography and/or recrystallization.

The following examples illustrate the best mode contemplated by the inventor for carrying out his invention, but are not to be construed as limiting the scope thereof.

Example 1.—3,4-diphenyl-2-cyclohexen-1-one (III)

Deoxybenzoin (10.0 g.) in 100 ml. of benzene was added to methanol-free sodium methoxide prepared from 1.15 g. of sodium metal. The resulting mixture was cooled in ice. Over the period of 20 minutes, there was added a solution of 4.0 g. of methyl vinyl ketone in 40 ml. of benzene. The mixture was then heated under reflux for 30 minutes, cooled in ice and decomposed by the addition of 50 ml. of saturated aqueous ammonium chloride. The organic layer was separated and washed in turn with water and brine. The viscous oil which remained after the solvent was removed, was chromatographed over Florisil (synthetic magnesium silicate, hereinafter called Florisil). Elution with 2.5% acetone in ligroin, followed by 5% acetone in ligroin gave 4.12 g. of unchanged deoxybenzoin, followed by 6.09 g. of crude product. The latter was recrystallized from ligroin to yield 5.56 g. of 3,4-diphenyl-2-cyclohexen-1-one (III), M.P. 96–99° C. An analytical sample prepared by additional recrystallization from ligroin melted at 96.5–98.5° C.

Analysis.—Calcd. for $C_{18}H_{16}O$: C, 87.06; H, 6.50. Found: C, 86.52; H, 6.38.

In the same manner following the procedure of Example 1, above, but substituting the appropriate substituted deoxybenzoins of Formula II in place of deoxybenzoin is productive of the corresponding 3,4-diphenyl-2-cyclohexen-1-ones of Formula III, for example, using
4,4'-dimethyldeoxybenzoin,
4-bromodeoxybenzoin,
4,4'-dichlorodeoxybenzoin,
2-chloro-2',4'-dimethyldeoxybenzoin,
4,4'-difluorodeoxybenzoin,
4'-fluorodeoxybenzoin,
2'-fluoro-5'-methyldeoxybenzoin,
2,4-dimethyldeoxybenzoin,
4'-chloro-4-methyldeoxybenzoin,
2-fluorodeoxybenzoin,
4-bromo-4'-chlorodeoxybenzoin,
4'-butyldeoxybenzoin,
4-methyldeoxybenzoin,
2,3',4'-trichlorodeoxybenzoin, there are obtained:

3,4-bis(4-methylphenyl)-2-cyclohexen-1-one,
3-phenyl-4-(4-bromophenyl)-2-cyclohexen-1-one,
3,4-bis(4-chlorophenyl)-2-cyclohexen-1-one,
3-(2,4 - dimethylphenyl)-4-(2 - chlorophenyl)-2-cyclohexen-1-one,
3,4-bis(4-fluorophenyl)-2-cyclohexen-1-one,
3-(4-fluorophenyl)-4-phenyl-2-cyclohexen-1-one,
3 - (2 - fluoro-5-methylphenyl)-4-phenyl-2-cyclohexen-1-one,
3-phenyl-4-(2,4-dimethylphenyl)-2-cyclohexen-1-one,
3-(4 - chlorophenyl)-4-(4-methylphenyl)-2-cyclohexen-1-one,
3-phenyl-4-(2-fluorophenyl)-2-cyclohexen-1-one,
3-(4 - chlorophenyl)-4-(4-bromophenyl)-2-cyclohexen-1-one,
3-(4-butylphenyl)-4-phenyl-2-cyclohexen-1-one,
3-phenyl-4-(4-methylphenyl)-2-cyclohexen-1-one, and
3 - (3,4 - dichlorophenyl)-4-(2 - chlorophenyl)-2-cyclohexen-1-one, respectively.

Example 2.—3,4-diphenyl-1-pyrrolidino-1,3-cyclohexadiene (IV)

A solution of 6.1 g. of 3,4-diphenyl-2-cyclohexen-1-one and 6 ml. of pyrrolidine in 150 ml. of benzene was heated overnight at reflux under a water trap. The excess reagent and solvent were removed in vacuum. The residue was recrystallized from ether to afford 6.22 g. of 3,4-diphenyl-1-pyrrolidino-1,3-cyclohexadiene (IV), M.P. 128–130° C.

An analytical sample of 3,4-diphenyl-1-pyrrolidino-1,3-cyclohexadiene (recrystallization from ether) melted at 128–131.5° C. The NMR spectrum shows the vinyl proton as a singlet at 4.75δ.

*Analysis.*—Calcd. for $C_{22}H_{23}N$: C, 87.66; H, 7.69. Found: C, 87.62; H, 7.64.

In the same manner substituting other compounds of Formula III in place of 3,4-diphenyl-2-cyclohexen-1-one is productive of the corresponding 1-pyrrolidino derivatives thereof (IV), for example, using the compounds prepared and listed in the last paragraph of Example 1, above, there are obtained:

3,4-bis(4-methylphenyl)-1-pyrrolidino-1,3-cyclohexadiene,
3 - phenyl-4-(4 - bromophenyl)-1-pyrrolidino-1,3-cyclohexadiene,
3,4-bis(4-chlorophenyl)-1-pyrrolidino-1,3-cyclohexadiene,
3-(2,4 - dimethylphenyl)-4-(2 - chlorophenyl)-1-pyrrolidino-1,3-cyclohexadiene,
3,4 - bis(4 - fluorophenyl)-1-pyrrolidino-1,3-cyclohexadiene,
3 - (4 - fluorophenyl)-4-phenyl-1-pyrrolidino-1,3-cyclohexadiene,
3-(2 - fluoro-5-methylphenyl)-4-phenyl-1-pyrrolidino-1,3-cyclohexadiene,
3-phenyl-4-(2,4 - dimethylphenyl)-1-pyrrolidino-1,3-cyclohexadiene,
3-(4 - chlorophenyl)-4-(4 - methylphenyl)-1-pyrrolidino-1,3-cyclohexadiene,
3 - phenyl-4-(2 - fluorophenyl)-1-pyrrolidino-1,3-cyclohexadiene,
3-(4 - chlorophenyl)-4-(4 - bromophenyl)-1-pyrrolidino-1,3-cyclohexadiene,
3-(4 - butylphenyl)-4-phenyl-1-pyrrolidino-1,3-cyclohexadiene,
3 - phenyl-4-(4 - methylphenyl)-1-pyrrolidino-1,3-cyclohexadiene, and
3-(3,4 - dichlorophenyl)-4-(2 - chlorophenyl)-1-pyrrolidino-1,3-cyclohexadiene, respectively.

Similarly, other secondary amines of the formula

where $R_1$ and $R_2$ have the meanings hereinbefore given, can be substituted in place of pyrrolidine to obtain the corresponding enamines of the compounds of Formula III, namely the corresponding compounds of Formula IV.

Example 3.—5,6-diphenyl-4,6,7,8-tetrahydro-2(3H)-naphthalenone (I)

To a suspension of 3.01 g. of 3,4-diphenyl-1-pyrrolidino-1,3-cyclohexadiene and 1.66 g. of finely powdered potassium iodide in 20 ml. of dimethylformamide under nitrogen was added a solution of 2.05 g. of 1,3-dichloro-2-butene in 5 ml. of dimethylformamide. The reaction mixture was stirred for about 30 minutes at room temperature and then 10 ml. of water was added. After an additional 2 hours' stirring, ether was added. The organic layer was separated, washed well with water and brine and taken to dryness. The residue thus obtained was chromatographed over Florisil and eluted with Skellysolve B hexanes containing 1.25% acetone, giving 2-(3-chloro-2-butenyl) - 3,4 - diphenyl-3-cyclohexen-1-one as waxy crystals. This material was recrystallized twice from ligroin to yield 1.28 g. of 2-(3-chloro-2-butenyl)-3,4- diphenyl-3-cyclohexen-1-one (V), M.P. 70–80° C., $\gamma_{max.}$ 1702 cm.$^{-1}$, strong Beilstein test.

Ten milliliters of concentrated sulfuric acid was then added to a solution of the 2-(3-chloro-2-butenyl)-3,4-diphenyl-3-cyclohexen-1-one (V) obtained above, which had been dissolved in 5 ml. of ether. Following a reaction period of 5 minutes, the mixture was neutralized with aqueous sodium carbonate solution and extracted with ether: methylene chloride. The extract thus obtained was washed with water and brine and taken to dryness. The residue thus obtained was then chromatographed over Florisil and eluted with Skellysolve B hexanes containing 5% acetone to yield 0.22 g. of crude crystalline 5,6-diphenyl-4,6,7,8-tetrahydro-2(3H)-naphthalenone and 0.38 g. of gummy material comprising 2-(3-oxobutyl)-3,4-diphenyl-2-cyclohexen-1-one (VI) which showed infrared bands at both 1705 and 1655 cm.$^{-1}$. The crystalline fraction was recrystallized twice from methanol to afford 0.10 g. of 5,6-diphenyl-4,6,7,8-tetrahydro-2(3H)-naphthalenone (I), M.P. 144–145.5° C.; the mixed M.P. of this with the 5,6-diphenyl-4,6,7,8-tetrahydro-2(3H)-naphthalenone obtained in Example 5 below was 143–145° C.

*Analysis.*—Calcd. for $C_{22}H_{20}O$: C, 87.96; H, 6.71. Found: C, 87.78; H, 6.98.

The 0.38 g. of crude 2-(3-oxabutyl)-3,4-diphenyl-2-cyclohexen-1-one obtained above was dissolved in 10 ml. of benzene containing 100 mg. of p-toluenesulfonic acid and the solution was heated under reflux for about 1.5 hours. The solution was allowed to cool, washed with aqueous sodium bicarbonate solution and water and taken to dryness. The residual solid thus obtained was recrystallized once from methanol to give an additional 0.32 g. of 5,6-diphenyl-4,6,7,8-tetrahydro-2(3H)-naphthalenone (I), M.P. 139–142° C.

Example 4.—5,6-diphenyl-4,6,7,8-tetrahydro-2(3H)-naphthalenone (I)

The reaction sequence of Example 3, above, was repeated using 7.32 g. of 3,4-diphenyl-1-pyrrolidino-1,3-cyclohexadiene as the starting material and correspondingly larger amounts of the other reagents. The reaction sequence (IV→V→VI→I) was carried out without the isolation or purification of any intermediates. The residue obtained after solvent removal following the treatment with p-toluenesulfonic acid was chromatographed over Florisil. The crystalline fractions obtained from the eluate were recrystallized from cyclohexane to give 3.33 g. of 5,6-diphenyl-4,6,7,8-tetrahydro - 2(3H) - naphthalenone, M.P. 140–143° C.

In the same manner following the procedure of Example 3 or 4, above, but substituting other compounds of Formula IV as the starting material in place of 3,4-diphenyl-1-pyrrolidino-1,3-cyclohexadiene is productive of the corresponding 5,6-diphenyl-4,6,7,8-tetrahydro-2(3H)-naphthalenones of Formula I. For example, using the enamines prepared and listed in Example 2, above, there are obtained:

5,6-bis(4-methylphenyl)-4,6,7,8-tetrahydro-2(3H)-naphthalenone,
5-phenyl-6-(4-bromophenyl)-4,6,7,8-tetrahydro-2(3H)-naphthalenone,
5,6-bis(4-chlorophenyl)-4,6,7,8-tetrahydro-2(3H)-naphthalenone,
5-(2,4-dimethylphenyl)-6-(2-chlorophenyl)-4,6,7,8-tetrahydro-2(3H)-napthalenone,
5,6-bis(4-fluorophenyl)-4,6,7,8-tetrahydro-2-(3H)-naphthalenone,
5-(4-fluorophenyl)-6-phenyl-4,6,7,8-tetrahydro-2(3H)-naphthalenone,
5-(2-fluoro-5-methylphenyl)-6-phenyl-4,6,7,8-tetrahydro-2(3H)-naphthalenone,
5-phenyl-6-(2,4-dimethylphenyl)-4,6,7,8-tetrahydro-2(3H)-naphthalenone, 5-(4-chlorophenyl)-6-(4-methylphenyl)-4,6,7,8-
tetrahydro-2(3H)-naphthalenone,
5-phenyl-6-(2-fluorophenyl)-4,6,7,8-tetrahydro-
2(3H)-naphthalenone,
5-(4-chlorophenyl)-6-(4-bromophenyl)-4,6,7,8-
tetrahydro-2(3H)-naphthalenone,
5-(4-butylphenyl)-6-phenyl-4,6,7,8-tetrahydro-
2(3H)-naphthalenone,
5-phenyl-6-(4-methylphenyl)-4,6,7,8-tetrahydro-
2(3H)-naphthalenone, and
5-(3,4-dichlorophenyl)-6-(2-chlorophenyl)-4,6,7,8-
tetrahydro-2(3H)-naphthalenone, respectively.

Example 5.—5,6-diphenyl-4,6,7,8-tetrahydro-
2(3H)-naphthalenone (I)

A solution of 0.77 g. of freshly distilled methyl vinyl ketone in 30 ml. of tetrahydrofuran was added to a solution of 3.01 g. of 3,4-diphenyl-1-pyrrolidino-1,3-cyclohexadiene (IV) in 60 ml. of tetrahydrofuran over the period of 30 minutes. The mixture was stirred under nitrogen at room temperature for 30 minutes and at reflux for 4 hours. A solution of 2 g. of sodium acetate in 2 ml. of acetic acid and 4 ml. of water was then added and reflux was continued overnight. The bulk of the solvent was removed under reduced pressure and the residue was dissolved in ether. The solution was washed in turn with water, 2.5 N hydrochloric acid, water and brine. The residue which remained when the solvent was removed was chromatographed over Florisil. Elution with 2.5% and then 5% acetone in ligroin gave a succession of gums. The latter were combined and rechromatographed on neutral alumina (elution with 1:1 benzene-ether). The crystalline fractions were combined and recrystallized twice from methanol to give 31.8 mg. of 5,6-diphenyl-4,6,7,8-tetrahydro-2(3H)-naphthalenone (I), M.P. 141–143.5° C., $\gamma_{max.}$ 235 m$\mu$($\epsilon$=4,780), 307 m$\mu$ ($\epsilon$=11,800).

In the same manner following the procedure of Example 5, but substituting other compounds of Formula IV as the starting material in place of 3,4-diphenyl-1-pyrrolidino-1,3-cyclohexadiene is productive of the corresponding 5,6-diphenyl-4,6,7,8-tetrahydro - 2(3H) - naphthalenones of Formula I. For example, using the enamines prepared and listed in Example 2, above, there are obtained the same respective compounds as listed in the last paragraph of Example 4, above.

Example 6.—3,4-diphenyl-2-methyl-3-
cyclohexen-1-one (VII)

A mixture of 3.0 g. of 3,4-diphenyl-1-pyrrolidino-1,3-cyclohexadiene (IV) and 2 ml. of methyl iodide in 20 ml. of dimethylformamide was stirred under nitrogen at room temperature for 18 hours. Water (10 ml.) was then added and stirring was continued for 3 hours. Ether was then added and the organic layer was washed with water and brine. The solid which remained after the solvent was removed from the organic layer was recrystallized twice from ligroin to give 1.19 g. of 3,4-diphenyl-2-methyl-3-cyclohexen-1-one (VII), M.P. 66–70° C., $\gamma_{max.}$ 1705 cm.$^{-1}$, doublet in NMR at 1.16$\delta$.

Analysis.—Calcd. for $C_{19}H_{18}O$: C, 86.98; H, 6.91. Found: C, 86.98; H, 7.17.

In the same manner following the procedure of Example 5, but substituting other compounds of Formula IV as the starting material in place of 3,4-diphenyl-1-pyrrolidino-1,3-cyclohexadiene is productive of the corresponding 3,4-diphenyl-2-methyl-3-cyclohexen-1-ones of Formula VII. For example, using the enamines prepared and listed in Example 2, above, there are obtained:

3,4-bis(4-methylphenyl)-2-methyl-3-cyclohexene-1-one,
3-phenyl-4-(4-bromophenyl)-2-methyl-
  3-cyclohexene-1-one,
3,4-bis(4-chlorophenyl)-2-methyl-3-cyclohexen-1-one,
3-(2,4-dimethylphenyl)-4-(2-chlorophenyl)-
  2-methyl-3-cyclohexen-1-one,
3,4-bis(4-fluorophenyl)-2-methyl-3-cyclohexen-1-one,
3-(4-fluorophenyl)-4-phenyl-2-methyl-
  3-cyclohexen-1-one,
3-(2-fluoro-5-methylphenyl)-4-phenyl-2-methyl-
  3-cyclohexen-1-one,
3-phenyl-4-(2,4-dimethylphenyl)-2-methyl-
  3-cyclohexen-1-one,
3-(4-chlorophenyl)-4-(4-methylphenyl)-2-methyl-
  3-cyclohexen-1-one,
3-phenyl-4-(2-fluorophenyl)-2-methyl-3-cyclohexen-1-one,
3-(4-chlorophenyl)-4-(4-bromophenyl)-2-methyl-
  3-cyclohexen-1-one,
3-(4-butylphenyl)-4-phenyl-2-methyl-3-cyclohexen-1-one,
3-phenyl-4-(4-methylphenyl)-2-methyl-
  3-cyclohexen-1-one, and
3-(3,4-dichlorophenyl)-4-(2-chlorophenyl)-2-methyl-
  3-cyclohexen-1-one, respectively.

Similarly, other 2-lower-alkyl (e.g., 2-ethyl; 2-sec. butyl, 2-hexyl and 2-octyl) compounds of Formula VII can be prepared by substituting the appropriate alkyl halides (e.g., ethyl iodide, sec. butyl bromide, hexyl iodide and octyl bromide) in place of methyl iodide.

Example 7.—5,6-diphenyl-4a-methyl-4,4a,7,8-tetrahydro-
2(3H)-naphthalenone (Ia)

A solution of 1.19 g. of 3,4-diphenyl-2-methyl-3-cyclohexen-1-one (VII) and 0.50 ml. of methyl vinyl ketone in 20 ml. of benzene was added over the period of 30 minutes to a suspension of methanol-free sodium methoxide (prepared from 0.10 g. of sodium metal) in 10 ml. of benzene. The reaction mixture was stirred for 2 hours at room temperature and then at reflux for 1 hour. The solution was allowed to cool, diluted with ether, and washed in turn with water and brine. The gum which remained when the solvent was removed was chromatographed over Florisil (elution with Skellysolve B hexanes containing 2.5% acetone). Crystalline fractions which were recrystallized twice from methanol afforded 0.72 g. of 5,6 - diphenyl - 4a - methyl - 4,4a,7,8 - tetrahydro - 2(3H)-naphthalenone (Ia), M.P. 131–134° C.; $\gamma_{max.}$ 238 m$\mu$($\epsilon$=19,800).

Analysis.—Calcd. for $C_{23}H_{22}O$: C, 87.86; H, 7.05. Found: C, 87.54; H, 6.85.

In the same manner following the procedure of Example 7, above, but substituting other 3,4 - diphenyl - 2 - methyl - 3 - cyclohexen - 1 - ones of Formula VII as the starting material in place of 3,4-diphenyl-2-methyl-3-cyclohexen-1-one is productive of the corresponding 5,6-diphenyl - 4a - methyl - 4,4a,7,8 - tetrahydro - 2(3H) - naphthalenones of Formula Ia. For example, using the 3,4-diphenyl-2-methyl-3-cyclohexen-1-ones prepared and listed in Example 6, above, there are obtained:

5,6-bis(4-methylphenyl)-4a-methyl-4,4a,7,8-tetrahydro-
  3(3H)-naphthalenone,
5-phenyl-6-(4-bromophenyl)-4a-methyl-4,4a,7,8-tetra-
  hydro-2(3H)-naphthalenone,
5,6-bis(4-chlorophenyl)-4a-methyl-4,4a,7,8-tetrahydro-
  2(3H)-naphthalenone,
5-(2,4-dimethylphenyl)-6-(2-chlorophenyl)-4a-methyl-
  4,4a,7,8-tetrahydro-2(3H)-naphthalenone,
5,6-bis(4-fluorophenyl)-4a-methyl-4,4a,7,8-tetrahydro-
  2(3H)-naphthalenone,
5-(4-fluorophenyl)-6-phenyl-4a-methyl-4,4a,7,8-tetra-
  hydro-2(3H)-naphthalenone,
5-(2-fluoro-5-methylphenyl)-6-phenyl-4a-methyl-4,4a,7,8-
  tetrahydro-2(3H)-naphthalenone,
5-phenyl-6-(2,4-dimethylphenyl)-4a-methyl-4,4a,7,8-
  tetrahydro-2(3H)-naphthalenone,
5-(4-chlorophenyl)-6-(4-methylphenyl)-4a-methyl-
  4,4a,7,8-tetrahydro-2(3H)-naphthalenone,
5-phenyl-6-(2-fluorophenyl)-4a-methyl-4,4a,7,8-tetra-
  hydro-2(3H)-naphthalenone,
5-(4-chlorophenyl)-6-(4-bromophenyl)-4a-methyl-
  4,4a,7,8-tetrahydro-2(3H)-naphthalenone 5-(4-butylphenyl)-6-phenyl-4a-methyl-4,4a,7,8-tetra-
hydro-2(3H)-naphthalenone,
5-phenyl-6-(4-methylphenyl)-4a-methyl-4,4a,7,8-tetra-
hydro-2(3H)-naphthalenone, and
5-(3,4-dichlorophenyl)-6-(2-chlorophenyl)-4a-methyl-
4,4a,7,8-tetrahydro-2(3H)-naphthalenone, respectively.

Similarly, other 4a-lower-alkyl (e.g., 4a-ethyl, 4a-sec. butyl, 4a-hexyl and 4a-octyl) compounds of Formula Ia can be prepared by substituting the appropriate 3,4-diphenyl-2-lower-alkyl-3-cyclohexen-1-ones of Formula VII, e.g., the 2-ethyl, 2-sec. butyl, 2-hexyl and 2-octyl compounds of Formula VII, for the 3,4-diphenyl-2-methyl-3-cyclohexen-1-ones above.

I claim:
1. A compound of the formula:

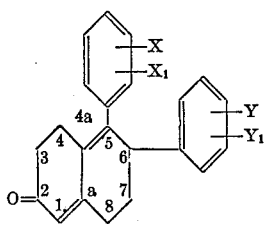

wherein X, X₁, Y and Y₁ are each hydrogen, lower-alkyl of 1 to 8 carbon atoms, inclusive, or halogen.

2. 5,6 - diphenyl - 4,6,7,8 - tetrahydro - 2(3H) - naphthalenone, a compound of claim 1, wherein X, X₁, Y and Y₁ are each hydrogen.

3. The process for the production of a 5,6-diphenyl-4,6,7,8-tetrahydro-2(3H)-naphthalenone of the formula:

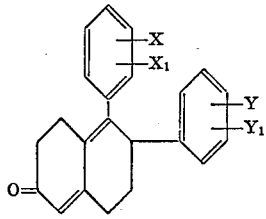

wherein X, X₁, Y and Y₁ are each hydrogen, lower-alkyl of 1 to 8 carbon atoms, inclusive, or halogen, which comprises reacting a 3,4-diphenyl-1-amino-1,3-cyclohexadiene of the formula:

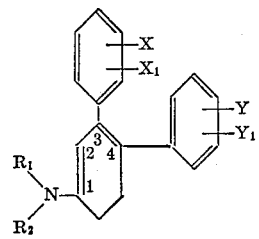

wherein X, X₁, Y and Y₁ have the meanings given above, R₁ and R₂ taken separately are each lower-alkyl as hereinbefore defined and R₁ and R₂ taken together with —N< constitute a saturated heterocyclic amino radical

of from 5 to 9 ring atoms, inclusive, with 1,3-dichloro-2-butene in the presence of sodium or potassium iodide; treating the corresponding 2-(3-chloro-2-butenyl)-3,4-diphenyl-3-cyclohexen-1-one so obtained with concentrated sulfuric acid to obtain a mixture comprising the corresponding 2-(3-oxobutyl)-3,4-diphenyl-2-cyclohexen-1-one and the corresponding 5,6-diphenyl-4,6,7,8-tetrahydro-2(3H)-naphthalenone, and converting the 2-(3-oxobutyl)-3,4-diphenyl-2-cyclohexen-1-one thus obtained by dehydration with benzenesulfonic acid or p-toluenesulfonic acid to obtain the corresponding 5,6-diphenyl-4,6,7,8-tetrahydro-2(3H)-naphthalenone.

4. The process of claim 3 which includes the additional step of isolating the 5,6-diphenyl-4,6,7,8-tetrahydro-2(3H)-naphthalenone thus obtained from the reaction mixture.

5. The process of claim 3 wherein the starting material is 3,4-diphenyl-1-pyrrolidino-1,3-cyclohexadiene and the product obtained is 5,6-diphenyl-4,6,7,8-tetrahydro-2(3H)-naphthalenone.

References Cited

UNITED STATES PATENTS 3,164,607   1/1965   Lednicer.
3,293,263  12/1966   Lednicer.

DANIEL D. HORWITZ, Primary Examiner.

U.S. Cl. X.R.

260—239, 247, 247.1, 268, 293, 326.8; 424—331